United States Patent
Hosein et al.

(10) Patent No.: US 6,217,834 B1
(45) Date of Patent: Apr. 17, 2001

(54) ULTRAVIOLET RADIATION LAMP AND SOURCE MODULE AND TREATMENT SYSTEM CONTAINING SAME

(75) Inventors: Feraz Hosein; Ted Mao; Rob Brunet, all of London (CA)

(73) Assignee: Trojan Technologies Inc. (CA)

( * ) Notice: Subject to any disclaimer, the term of this patent is extended or adjusted under 35 U.S.C. 154(b) by 0 days.

(21) Appl. No.: 09/293,993

(22) Filed: Apr. 19, 1999

(51) Int. Cl.[7] .................................. B01J 19/12; C02F 1/48
(52) U.S. Cl. ........................ 422/186.3; 210/748; 96/224
(58) Field of Search ...................... 422/186.3; 392/341, 392/344, 480, 483; 219/530, 540; 210/748; 96/224

(56) References Cited

U.S. PATENT DOCUMENTS

| | | | |
|---|---|---|---|
| 2,189,279 | 2/1940 | Bitner | 204/24 |
| 3,562,520 | 2/1971 | Hippen | 250/43 |
| 3,723,783 | * 3/1973 | Beese et al. | 313/32 |
| 4,841,422 | * 6/1989 | Groh | 362/294 |
| 4,857,204 | 8/1989 | Joklik | 210/695 |
| 5,054,107 | * 10/1991 | Batchelder | 392/483 |
| 5,266,280 | 11/1993 | Hallett | 422/186.3 |
| 5,404,281 | * 4/1995 | Parker | 362/208 |
| 5,418,370 | * 5/1995 | Maarschalkerweerd | 250/431 |
| 5,539,210 | * 7/1996 | Maarschalkerweerd | 250/372 |
| 6,054,097 | * 4/2000 | Mass et al. | 422/186.3 |
| 6,126,841 | 10/2000 | Whitby et al. | 210/748 |

FOREIGN PATENT DOCUMENTS 59-150589   8/1984   (JP).
63-137793   6/1988   (JP).

* cited by examiner

Primary Examiner—Kathryn Gorgos
Assistant Examiner—Thao Tran
(74) Attorney, Agent, or Firm—Katten Muchin Zavis

(57) ABSTRACT

An ultraviolet radiation lamp comprising a heat absorbing element on the exterior thereof such that, during operation of the lamp, the temperature of the lamp in contact with the heat absorbing element is at a lower temperature than the remainder of the lamp. The use of the lamp in a radiation source module and a fluid treatment system is also described. The ultraviolet radiation lamp is particularly useful for treatment of fluids such ambient air (e.g., containing pollutants), warm liquids and the like.

42 Claims, 2 Drawing Sheets

ULTRAVIOLET RADIATION LAMP AND SOURCE MODULE AND TREATMENT SYSTEM CONTAINING SAME

BACKGROUND OF THE INVENTION

1. Field of the Invention

In one of its aspects, the present invention relates to an ultraviolet radiation lamp. In another of its aspects, the present invention relates to a radiation source module comprising the ultraviolet radiation lamp. In another of its aspects, the present invention relates to a fluid treatment system comprising the ultraviolet lamp.

2. Description of the Prior Art

Fluid treatment systems are known generally in the art.

For example, U.S. Pat. Nos. 4,482,809, 4,872,980, 5,006,244, 5,418,370, 5,504,335, 5,539,210 and 5,590,390 (all in the name of Maarschalkerweerd and all assigned to the assignee of the present invention), the contents of each of which are hereby incorporated by reference, all describe gravity fed fluid treatment systems which employ ultraviolet (UV) radiation.

Generally, such prior fluid treatment systems employ an ultraviolet radiation lamp to emit radiation of a particular wavelength or range of wavelengths (usually between 185 and 400 run) to effect bacterial kill in or other treatment of the fluid being treated. Many conventional ultraviolet radiation lamps are known as "low pressure" mercury lamps.

In use, it is usually necessary that a "cold spot" be maintained in such lamps to allow the excess mercury in the lamp to condense thereby maintaining an adequate mercury vapour pressure for efficient emission of ultraviolet radiation. If the "cold spot" temperature is not within a narrow temperature range, the mercury vapour pressure in the low pressure lamp may not be suitable for efficient generation of UV radiation. Specifically, too high or too low a "cold spot" temperature will result in loss of efficiency of emission of UV radiation. This can lead to inadequate treatment of the fluid being treated.

When such mercury lamps are used in a fluid treatment system such as one of the specific systems described and illustrated in the Maarschalkerweerd patents referred to above, the necessary "cold spot" is through heat exchange with the water being treated since the water is moving and is typically at ambient temperature. However, when it is desirable to treat a fluid such as ambient air (e.g., containing pollutants that could be photocatalyzed) or relatively warm fluids (e.g., at temperatures greater than about 40° C.), there is a significant risk that the a "cold spot" having the desired suitable temperature will not be formed leading to the problems set out above.

Accordingly, it would be desirable to have an ultraviolet radiation lamp which, in use, provides the needed "cold spot" in a controllable fashion and could be used to treat ambient air, ambient gas or relatively warm fluids. It would be advantageous if the solution to the problem could be achieved with little or no redesign df the ultraviolet radiation lamp.

SUMMARY OF THE INVENTION

It is an object of the invention to obviate or mitigate at least one of the above-mentioned disadvantages of the prior art.

It is another object of the present invention to provide a novel ultraviolet radiation lamp.

It is yet another object of the present invention to provide a novel radiation source module for use in a fluid treatment system.

It is yet another object of the present invention to provide a novel fluid treatment system.

Accordingly, in one of its aspects the present invention provides an ultraviolet radiation lamp comprising a heat absorbing element on the exterior thereof such that, during operation of the lamp, the temperature of the lamp in contact with the heat absorbing element is at a lower temperature than the remainder of the lamp.

In another of its aspects the present invention provides a radiation source module for use in a fluid treatment system, the module comprising an ultraviolet radiation lamp comprising a heat absorbing element on the exterior thereof such that, during operation of the lamp, the temperature of the lamp in contact with the heat absorbing element is at a lower temperature than the remainder of the lamp, and support means to mount the module in the fluid treatment system.

In yet another of its aspects, the present invention provides a fluid treatment system comprising a fluid treatment zone and a radiation source module, the module comprising an ultraviolet radiation lamp disposed in the fluid treatment zone, the ultraviolet radiation lamp comprising a heat absorbing element on the exterior thereof such that, during operation of the lamp, the temperature of the lamp in contact with the heat absorbing element is at a lower temperature than the remainder of the lamp, and support means to mount the module to the fluid treatment system.

Thus, the present inventors have discovered that placement of a heat absorbing element on the exterior of the ultraviolet lamp provides a simple and effective manner for creating a cold spot in the lamp which allows for efficient emission of ultraviolet radiation. Thus, the invention may be practiced by retrofitting an otherwise conventional ultraviolet radiation lamp with the heat absorbing element. In other words, the complete redesign of the ultraviolet radiation lamp is not necessary to practice the invention.

In use, the heat absorbing element in the present ultraviolet radiation lamp functions as a "heat sink" on the exterior surface of the lamp. As such, during use in a fluid incapable of inherently providing the desirable "cold spot", the heat absorbing element removes heat from the area of the lamp with which it is in contact. The result is the creation of a "cold spot" on the interior surface of lamp (i.e., wherein the mercury vapour is contained) corresponding to that area. The mercury vapour condenses on the cold spot thereby resulting in efficient emission of ultraviolet radiation from the lamp.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
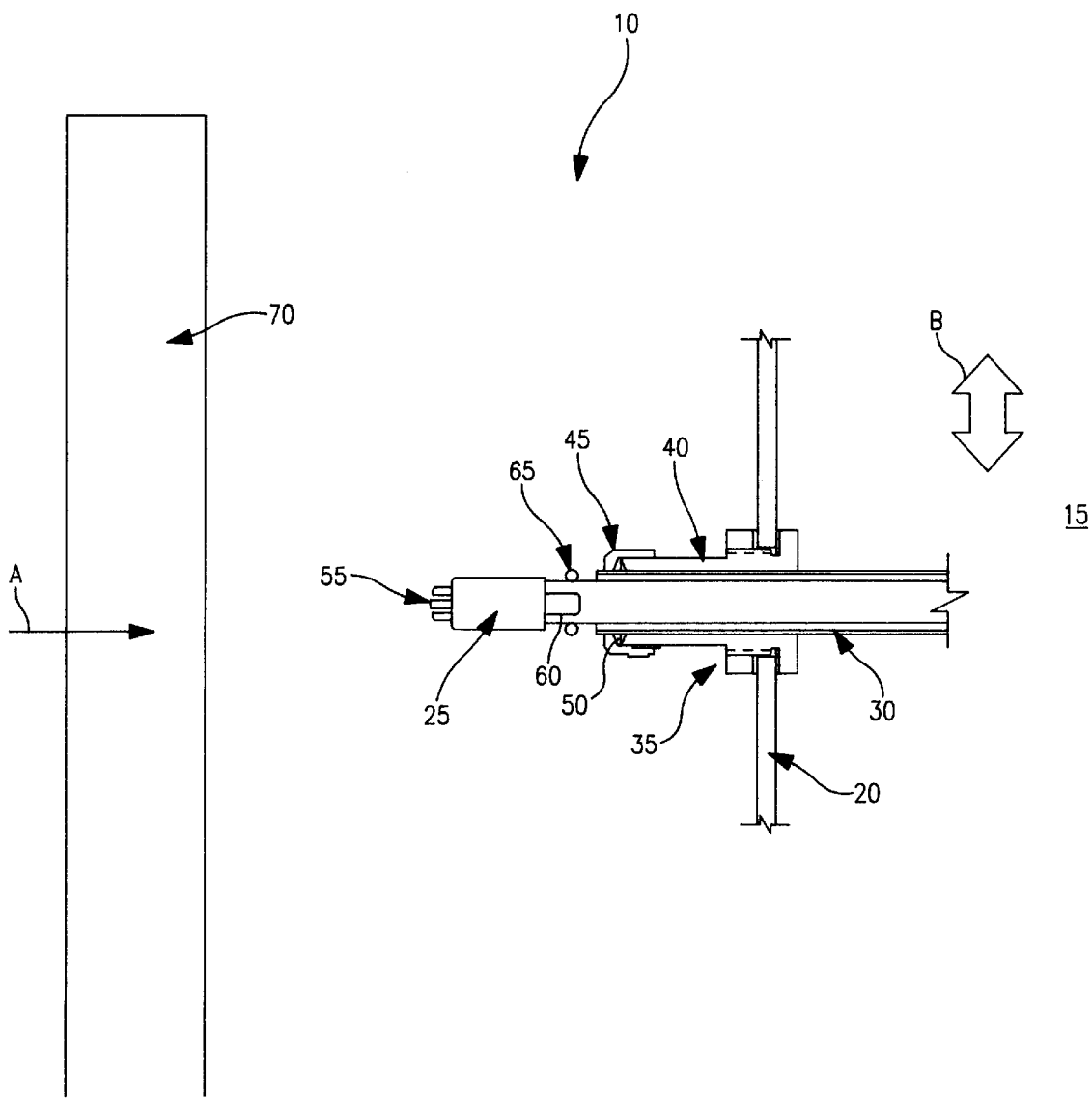
FIG. 1 is a side elevation, in partial cross-section, of a preferred embodiment of the present fluid treatment system.
Figure 2A:
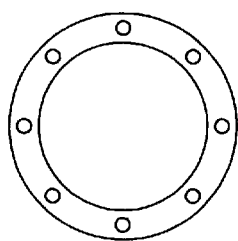
FIGS. 2A–D illustrate a side elevation of various embodiments of a heat absorbing element useful in the present ultraviolet radiation lamp.
Figure 3A:
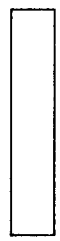
FIGS. 3A–D illustrate an end view of each of the various embodiments of the heat absorbing elements illustrated in FIG. 2.
Figure 2B:
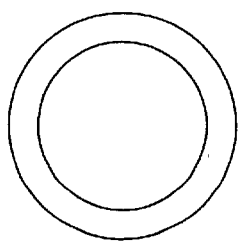
Figure 3B:
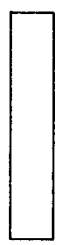
Figure 2C:
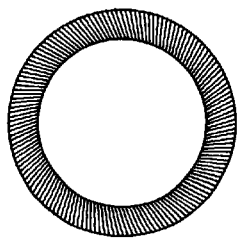
Figure 3C:
Figure 2D:
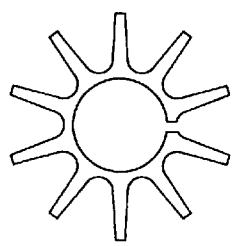
Figure 3D:

With reference to FIG. 1, there is illustrated a fluid treatment system 10. Fluid treatment system 10 comprises a fluid treatment zone 15. Fluid treatment zone 15 is defined by a chamber having a chamber wall 20 (for clarity, the entirety of the chamber is not illustrated).

Disposed in fluid treatment zone 15 is an ultraviolet radiation lamp 25. The nature of the ultraviolet radiation lamp 25 is not particularly restricted. As stated hereinabove the present invention is particularly applicable to mercury-based ultraviolet radiation lamps. Thus, it is preferred to selected lamp 25 from one of such lamps. Lamp 25 may be a conventional low pressure lamp, commonly referred to as G36T6L and G64T5L, supplied by manufacturers such as Light Sources Inc. and Voltarc Technologies Inc.

Lamp 25 is disposed within a protective sleeve 30. Preferably, protective sleeve 30 is a quartz sleeve.

The unit of lamp 25 and protective sleeve 30 are connected to chamber wall 20 by a conventional sleeve/compression seal nut assembly 35. Thus, assembly 35 comprises a sleeve 40 having a threaded end to which a nut 45 is engaged. Disposed between sleeve 40 and nut 45 is a rubber O-ring 50 which is compressed to form a seal with protective sleeve 30.

At the end of lamp 25 there are a series of electrical connector pins 55. Pins 55 are connected via a suitable connection (not shown) to an electrical supply (not shown). The mode of connection and the electrical supply are conventional.

Lamp 25 comprises an electrode filament 60 disposed adjacent pins 55. An opposed electrode filament (not shown) is disposed at the opposite end of lamp 25. As is known in the art, the region in lamp 25 between the electrodes is known as the "arc length"—i.e, the region of the lamp from which ultraviolet radiation is emitted. Depending on the nature of lamp 25, the electrical connections from both electrodes in a lamp can be disposed at one end of the lamp or at opposed ends of the lamp. Either type of electrical connection scheme is suitable herein.

Disposed on the exterior of lamp 25 is a heat absorbing element 65. In the preferred embodiment of the present ultraviolet radiation lamp, heat absorbing element 65 is an annular helical copper spring—see embodiment C in FIGS. 2 and 3. Of course, heat absorbing element 65 may be made from any other material having suitable heat absorbing capability (e.g., aluminum, brass and the like).

Adjacent lamp 25, there is disposed a heat exchange unit 70. Unit 70 comprises an air conditioning unit (not shown) capable of cooling air which travels through unit 70 in the direction of arrow A.

Alternative embodiments A, B and D of heat absorbing element 65 are illustrated in FIG. 2 and 3.

Fluid treatment system 10 may be operated in the following manner.

Air influent (e.g., containing bacterial or other pollutant to be treated) is fed into fluid treatment zone 15 in either of the directions of arrow B. Lamp 25 is powered and heat exchange unit 70 is activated.

The air to be treated passes by protective sleeve 30. Protective sleeve 30 insulates lamp 25 and, in itself, causes lamp 25 to operate at a relatively high temperature which prevents formation of an adequate "cold spot" along the surface of protective sleeve 30. The provision of heat absorbing element 65 on the exterior of lamp 25 allows for the formation of the "cold spot" on the interior of lamp 25 since heat absorbing element 65 acts as a heat sink.

The heat sink function of heat absorbing element 65 is enhanced by the use of heat exchange unit 70. Specifically, relatively cool air from unit 70 is passed over heat absorbing element 65 enhancing its heat sink properties. If desired, heat exchange unit 70 may be controlled by a thermostat (not shown) which monitors the temperature of the air passing over heat absorbing element 65 and compares that with a pre-determined temperature value—the use of such a thermostat is conventional.

The provision of the "cold spot" allows for improved and/or optimum operation of lamp 25.

While the present invention has been described with reference to preferred and specifically illustrated embodiments, it will of course be understood by those of skill in the arts that various modifications to these preferred and illustrated embodiments may be made without the parting from the spirit and scope of the invention. For example, while the illustrated embodiment has been shown with reference to air treatment, the present ultraviolet radiation lamp may be used with a variety of different modules (e.g., see the modules in the Maarschalkerweerd patents referred to hereinabove) and a variety of other fluid treatment techniques (e.g., in combination with photocatalysts to degrade organic pollutants). Further, the present ultraviolet lamp does not necessarily require a protective sleeve. Still further, while the heat absorbing element may be disposed at any location on the exterior of the lamp, it is preferred to located it outside the arc length to avoid blockage of the ultraviolet radiation. Still further, the heat absorbing element may be disposed on the exterior of the ultraviolet lamp such that the protective sleeve, if used, covers the heat absorbing element. Still further, it is possible to utilize a plurality of heat absorbing elements—i.e., this allows for modularization of the heat sink features of the heat absorbing element along the length of the lamp. Still further, the use of a heat exchange unit with the present ultraviolet radiation lamp is optional. Still further, the specific heat exchange unit may be modified to provide a direct connection to the heat absorbing element. Other modifications will be readily apparent to those with skill in the art.

What is claimed is:

1. An ultraviolet radiation lamp comprising a heat absorbing structure disposed on the exterior thereof such that, during operation of the lamp, the temperature of the lamp in contact with the heat absorbing structure is at a lower temperature than the remainder of the lamp, to cause mercury vapour condensation inside the lamp.

2. The ultraviolet radiation lamp defined in claim 1, wherein the heat absorbing structure is annular.

3. The ultraviolet radiation lamp defined in claim 1, wherein the heat absorbing structure comprises a helical spring.

4. The ultraviolet radiation lamp defined in claim 1, wherein the heat absorbing structure comprises an annular helical spring.

5. The ultraviolet radiation lamp defined in claim 1, wherein the heat absorbing structure comprises an annular helical copper spring.

6. The ultraviolet radiation lamp defined in claim 1, wherein the heat absorbing structure comprises a solid cross-section.

7. The ultraviolet radiation lamp defined in claim 1, wherein the heat absorbing structure comprises a perforated cross-section.

8. The ultraviolet radiation lamp defined in claim 1, wherein the heat absorbing structure comprises a spined cross-section.

9. The ultraviolet radiation lamp defined in claim 1, wherein the lamp comprises a pair of opposed electrodes defining an arc length therebetween.

10. The ultraviolet radiation lamp defined in claim 9, wherein the heat absorbing structure is disposed over one of the electrodes.

11. The ultraviolet radiation lamp defined in claim 9, wherein the heat absorbing structure is disposed over the arc length.

12. A radiation source module for use in a fluid treatment system, the module comprising an ultraviolet radiation lamp comprising a heat absorbing structure disposed on the exterior thereof such that, during operation of the lamp, the temperature of the lamp in contact with the heat absorbing structure is at a lower temperature than the remainder of the lamp, to cause mercury vapour condensation inside the lamp adjacent the heat absorbing structure, and a support to mount the module in the fluid treatment system.

13. The radiation source module defined in claim 12, wherein the heat absorbing structure is annular.

14. The radiation source module defined in claim 12, wherein the heat absorbing structure comprises a helical spring.

15. The radiation source module defined in claim 12, wherein the heat absorbing structure comprises an annular helical spring.

16. The radiation source module defined in claim 12, wherein the heat absorbing structure comprises an annular helical copper spring.

17. The radiation source module defined in claim 12, wherein the heat absorbing structure comprises a solid cross-section.

18. The radiation source module defined in claim 12, wherein the heat absorbing structure comprises a perforated cross-section.

19. The radiation source module defined in claim 12, wherein the heat absorbing structure comprises a spined cross-section.

20. The radiation source module defined in claim 12, wherein the lamp comprises a pair of opposed electrodes defining an arc length therebetween.

21. The radiation source module defined in claim 20, wherein the heat absorbing structure is disposed over one of the electrodes.

22. The radiation source module defined in claim 20, wherein the heat absorbing structure is disposed over the arc length.

23. The radiation source module defined in claim 12, wherein the support is coaxially disposed with respect to the ultraviolet lamp.

24. The radiation source module defined in claim 12, wherein the support is orthogonally disposed with respect to the ultraviolet lamp.

25. A fluid treatment system comprising a fluid treatment zone and a radiation source module, the module comprising an ultraviolet radiation lamp disposed in the fluid treatment zone, the ultraviolet radiation lamp comprising a heat absorbing structure disposed on the exterior thereof outside an arc length of the lamp such that, during operation of the lamp, the temperature of the lamp in contact with the heat absorbing is at a lower temperature than the remainder of the lamp, to cause mercury vapour condensation inside the lamp, and a support to mount the module to the fluid treatment system.

26. The fluid treatment system defined in claim 25, wherein the heat absorbing structure is annular.

27. The fluid treatment system defined in claim 25, wherein the heat absorbing structure comprises a helical spring.

28. The fluid treatment system defined in claim 25, wherein the heat absorbing structure comprises an annular helical spring.

29. The fluid treatment system defined in claim 25, wherein the heat absorbing structure comprises an annular helical copper spring.

30. The fluid treatment system defined in claim 25, wherein the heat absorbing structure comprises a solid cross-section.

31. The fluid treatment system defined in claim 25, wherein the heat absorbing structure comprises a perforated cross-section.

32. The fluid treatment system defined in claim 25, wherein the heat absorbing structure comprises a spined cross-section.

33. The fluid treatment system defined in claim 25, wherein the lamp comprises a pair of opposed electrodes defining the arc length therebetween.

34. The fluid treatment system defined in claim 33, wherein the heat absorbing structure is disposed over one of the electrodes.

35. The fluid treatment system defined in claim 33, wherein the heat absorbing structure is disposed over the arc length.

36. The fluid treatment system defined in claim 25, wherein the support is coaxially disposed with respect to the ultraviolet lamp.

37. The fluid treatment system defined in claim 25, wherein the support is orthogonally disposed with respect to the ultraviolet lamp.

38. The fluid treatment system defined in claim 25, wherein the ultraviolet radiation lamp is disposed substantially transverse to the fluid flow.

39. The fluid treatment system defined in claim 25, wherein the ultraviolet radiation lamp is disposed substantially parallel to the fluid flow.

40. The fluid treatment system defined in claim 25, further comprising heat exchange means for removing heat from the heat absorbing structure.

41. The fluid treatment system defined in claim 25, for treatment of a gaseous influent.

42. The fluid treatment system defined in claim 25, for treatment of a liquid influent.

\* \* \* \* \*